(12) United States Patent
Boujemaa et al.

(10) Patent No.: US 12,518,378 B2
(45) Date of Patent: Jan. 6, 2026

(54) SYSTEM AND METHOD FOR PATIENTS STRATIFICATION THROUGH MACHINE-LEARNING IMMUNE CHECKPOINT INHIBITOR RESPONSE PREDICTION

(71) Applicant: MEDIAN TECHNOLOGIES, Valbonne (FR)

(72) Inventors: Nozha Boujemaa, Chaville (FR); Benoit Huet, Roquefort les Pins (FR); Vladimir Groza, Antibes (FR); Danny Francis, Antibes (FR)

(73) Assignee: MEDIAN TECHNOLOGIES, Valbonne (FR)

( * ) Notice: Subject to any disclaimer, the term of this patent is extended or adjusted under 35 U.S.C. 154(b) by 437 days.

(21) Appl. No.: 18/040,930

(22) PCT Filed: Aug. 26, 2021

(86) PCT No.: PCT/EP2021/073600
§ 371 (c)(1),
(2) Date: Feb. 7, 2023

(87) PCT Pub. No.: WO2022/043430
PCT Pub. Date: Mar. 3, 2022

(65) Prior Publication Data
US 2023/0316507 A1    Oct. 5, 2023

Related U.S. Application Data

(60) Provisional application No. 63/071,062, filed on Aug. 27, 2020.

(51) Int. Cl.
*G06T 7/00*    (2017.01)
*G16H 30/40*    (2018.01)
(Continued)

(52) U.S. Cl.
CPC ........... *G06T 7/0012* (2013.01); *G16H 30/40* (2018.01); *G16H 50/20* (2018.01); *G16H 50/30* (2018.01);
(Continued)

(58) Field of Classification Search
CPC ......... G06T 7/0012; G06T 2207/20084; G06T 2207/30096; G16H 30/40; G16H 50/20; G16H 50/30
See application file for complete search history.

(56) References Cited

U.S. PATENT DOCUMENTS

2017/0140533 A1*   5/2017   Nelson .............. G01N 15/1468
2018/0033144 A1    2/2018   Risman et al.
(Continued)

FOREIGN PATENT DOCUMENTS

WO    2019238804 A1    12/2019

OTHER PUBLICATIONS

Antong Chen et al., "A deep learning-facilitated radiomics solution for the prediction of lung lesion shrinkage in non-small cell lung cancer trials", arxiv.org, Cornell University Library, 201 Olin Library Cornell University Ithaca, NY 14853, Mar. 5, 2020, pp. 1-6.
(Continued)

*Primary Examiner* — Jennifer Mehmood
*Assistant Examiner* — Jose M Torres
(74) *Attorney, Agent, or Firm* — HAUPTMAN HAM, LLP

(57) ABSTRACT

A method of patient stratification between respondents and non-respondents to immuno-oncology (IO). This method, based on deep-learned features extracted owing to automatic AI-based models that have been fully-trained, goes beyond traditional radiomic standards, opening new perspective for a broader uptake of machine learning solutions in both patient care and drug development. Based on latest Machine
(Continued)

Learning advances, the here proposed method allows predicting non-invasively a patient's tumor response to immuno-oncology therapy based treatment. The here proposed method operates not only on early stage conditions though a whole organ and lesion-agnostic analysis for prediction, but also on advanced metastatic stages through a multi-organ analysis performing a disease-agnostic and stage-agnostic prediction, potentially in accordance with response criteria defined by the RECIST 1.1 evaluation methodology.

17 Claims, 4 Drawing Sheets

(51) Int. Cl.
  *G16H 50/20* (2018.01)
  *G16H 50/30* (2018.01)
(52) U.S. Cl.
  CPC ............. *G06T 2207/20084* (2013.01); *G06T 2207/30096* (2013.01)

(56) References Cited

U.S. PATENT DOCUMENTS

| | | | |
|---|---|---|---|
| 2020/0258223 | A1 | 8/2020 | Yip et al. |
| 2020/0380675 | A1* | 12/2020 | Golden ................. G06T 7/0012 |
| 2020/0381121 | A1* | 12/2020 | Wang ................... G06V 20/698 |
| 2021/0174154 | A1* | 6/2021 | Duncan ................. G16H 50/20 |
| 2023/0326582 | A1* | 10/2023 | Vaidya ................ G06V 10/764 382/128 |

OTHER PUBLICATIONS

Bodalal Zuhir et al., "Radiogenomics: bridging imaging and genomics", Abdominal Radiology, Springer US, New York, vol. 44, No. 6, May 2, 2019, pp. 1960-1984.
Wikipedia, "Non-small-cell lung carcinoma", pp. 1-14, Year: 2020.
Wikipedia, "Medoid", pp. 1-3, Year: 2020.
Shuo Wang et al., "Deep learning provides a new computed tomography-based prognostic biomarker for recurrence prediction in high-grade serous ovarian cancer", Radiotherapy and Oncology, 132 (2019) 171-177.
Andre Diamant et al., "Deep learning in head & neck cancer outcome prediction", Scientific Reports, (2019) 9:2764, pp. 1-10.
Kenny H. Cha et al., "Bladder Cancer Treatment Response Assessment in CT using Radiomics with Deep-Learning", Scientific Reports, 7:8738, pp. 1-12, Year: 2017.
Seokmin Han et al., "The Classification of Renal Cancer in 3-Phase CT Images Using a Deep Learning Method", Journal of Digital Imaging (2019) 32:638-643.
Yiwen Xu et al., "Deep Learning Predicts Lung Cancer Treatment Response from Serial Medical Imaging", Clinical Cancer Research, 25(11) Jun. 1, 2019, pp. 3266-3275.
Criteres RECIST version 1.1, Year: 2009.
International Search Report issued in corresponding International Application No. PCT/EP2021/073600, dated Dec. 21, 2021, European Patent Office, Rijswijk, Netherlands, pp. 1-4.
Written Opinion issued in corresponding International Application No. PCT/EP2021/073600, dated Dec. 21, 2021, European Patent Office, Munich, Germany, pp. 1-7.

* cited by examiner

SYSTEM AND METHOD FOR PATIENTS STRATIFICATION THROUGH MACHINE-LEARNING IMMUNE CHECKPOINT INHIBITOR RESPONSE PREDICTION

CROSS-REFERENCE TO RELATED APPLICATIONS

The present application is a U.S. National Phase of International Application Number PCT/EP2021/073600, filed Aug. 26, 2021, which claims priority to U.S. Provisional Application No. 63/071,062, filed Aug. 27, 2020.

TECHNICAL FIELD

The disclosure relates broadly to methods and frameworks of radiomics in order to stratify patients in function of their immunotherapy response.

The invention more particularly relates to a method of automatic radiomics for stratification of a plurality of patients in function of their immunotherapy response.

BACKGROUND

Radiomics refers to the extraction and analysis of quantitative imaging features with high throughput from various medical images obtained for instance with computed tomography (CT), positron emission tomography (PET) or magnetic resonance imaging (MRI).

In the early 2010s, AI applied to radiomics has been exposed to a growing renewed interest, when it has shown that fully-learned features for a given task were more appropriate than standard handcrafted solutions that were popular at that time. Since then, AI has witnessed significant advances.

Notably the field of immuno-oncology (IO) is facing recurrent challenges that have a direct impact on the efficiency and performance of drug development for pharmaceutical companies. Among the most salient challenges faced in the field of immuno-oncology, are ranked the development of non-invasive methods for the monitoring of immune checkpoint inhibitor (ICI) biomarkers and the recruitment of patients respondent to Immuno-therapy in clinical trials to increase, among other things, the Overall Response Rate (ORR), and to accelerate drug development. In an effort to deliver the right drug to the right "responding" patient, statistical behavior and observations of various patterns of these ICI markers and patient information have highlighted the possibility to create predictive models respective to the different population cohorts.

There exists:
1. some non-invasive methods for determining the imaging biomarkers that can be associated with clinical biomarkers and treatment response based on classical radiomic features extraction methods, couple with machine learning methods, and
2. some non-invasive methods to determine biomarkers for cancer prognostic based on deep-learned features.

Among the methods of the first itemized type, an article entitled "A deep learning-facilitated radiomic solution for the prediction of lung lesion shrinkage in non-small cell lung cancer trials" by A. Chen et al. discloses a deep learning-based approach for the prediction of lung lesion response based on radiomic features extracted from lung CT scans of patients in non-small cell lung cancer trials. Said approach begins with the classification of lung lesions at various locations between primary and metastatic lesions. Next step includes the automatic segmentation to extract the 3D volumes of lung lesions. Then radiomic features are extracted from lesions on the pre-treatment scan and the first follow-up to predict which lesions will shrink at least 30% in diameter during the treatment, such a shrinkage being defined as a partial response by the Response Evaluation Criteria In Solid Tumors (RECIST) guidelines. Eventually, the random forest (RF), gradient boosting and multilayer perceptron classifier models are trained on such cases to be able to predict if there will be such shrinkage of 30% of diameter for new previously unseen data.

Another article entitled "Radiomic response evaluation of recurrent or metastatic head and neck squamous cell cancer (R/M HNSCC) patients receiving pembrolizumab on KEYNOTE-012 study" by K. Taylor et al. and published in Journal of Clinical Oncology aims at identifying radiomic features that are associated with lesion-level response (LLR) and overall response (OR) to immunotherapy. For that purpose, tumoral and peritumoral radiomic features are extracted for 406 lesions from 132 patients treated with Pembrolizumab and the extracted radiomic features having a high Pearson correlation are aggregated. Each obtained cluster is then represented by its medoid, which leads to a shortlist of radiomic features. The authors found that some of these radiomic features were significantly correlated to LLR or OR.

A further article entitled "Predicting response to cancer immunotherapy using noninvasive radiomic biomarkers" by S. Trebeschi et al. and published in Annals of Oncology aims at extracting imaging features that can be associated (mostly indirectly) with the clinical biomarkers. Imaging features are extracted via the standard methods and existing libraries, namely PyRadiomics, that provide fixed and predefined set of image features that can be extracted. Final predictive models are based on such set of image features.

There are at least two different approaches resulting in the models that are used for the patients selection and differentiation: either classic statistical models or Machine Learning (ML) models. In this study, only one indirect symptom (connection) with the overall survival is taken into account for the final conclusion. Moreover, additional data from the follow-up are required to estimate the shrinkage level. Furthermore, standard radiomic features are extracted from the whole volume of the lesions and mostly its boundaries, without consideration for lesions surrounding information.

The methods of the second itemized type aim at avoiding any priors on what visual features are relevant to deal with a given problem of computer vision. In the context of cancer prognostic, deep models parameters are optimized with respect to an objective function so that they extract image features that are directly correlated to the clinical outcome that is aimed to be predicted.

Among the methods of the above second itemized type, one can cite for example:
1. an article entitled "Deep learning provides a new computed tomography-based prognostic biomarker for recurrence prediction in high-grade serous ovarian cancer" by S. Wang et al. and published in Radiotherapy and Oncology,
2. an article entitled "Deep learning in head & neck cancer outcome prediction" by A. Diamant et al.,
3. an article entitled "Bladder Cancer Treatment Response Assessment in CT using Radiomics with Deep-Learning" by Kenny H. Cha et al., 4. an article entitled "Deep Learning Predicts Lung Cancer Treatment Response from Serial Medical Imaging" by Y. Xu et al., and
5. an article entitled "The Classification of Renal Cancer in 3-Phase CT Images Using a Deep Learning Method" by S. Han et al. and published in Journal of Digital Imaging.

Such non-invasive methods to determine biomarkers for cancer prognostic based on deep-learned features suffer from several disadvantages. More particularly, the methods according to articles 1, 2, 4 and 5 as itemized above are not optimized directly for cancer prognosis since features are learned on another task (photos classification or image compression). In the method according to article 3, the neural network is trained on a task that is done better by radiologists.

SUMMARY

It is a general object of the invention to provide a method of automatic radiomics for stratification of a plurality of patients in function of their immunotherapy response which allows alleviating at least one drawback of the state of the art.

Another object of the invention is to provide such a method which allows performing a task that cannot be performed easily by radiologists.

Another object of the invention is to provide such a method which gives the right patient selection and/or which is flexible to obtain the radiomic features that can differentiate the patients and its treatment response in a robust manner.

Another object of the invention is to provide such a method which allows extracting some imaging features that are not pre-defined and/or that are not dependent on the organ of interest and/or that are strongly correlated with clinical outcomes.

According to a first aspect of the invention, it is provided a method of radiomics for stratification of a plurality of patients in function of their immunotherapy response, the method comprising:

For each patient among the plurality thereof:
  providing:
    a set of radiographic images of slices of at least a patient's body part, and
    clinical metadata record about the patient (clinical ground truth);
  extracting, among said set of radiographic images, radiographic images into which a first determined lesion has been scanned, those radiographic images being then gathered in a batch of radiographic images relevant for the first determined lesion,
  For each radiographic image of the batch, performing, by implementing a previously trained Deep Neural Network (DNN) model, a 2D analysis of the radiographic image for extracting therefrom at least one numeric score, where said at least one numeric score is correlated to a biomarker known as predicting the immunotherapy response of the patient, preferably said biomarker being also provided independently into said clinical metadata record about the patient;
  For the batch of radiographic images, aggregating the numeric scores previously extracted for determining a patient-level numeric score,
  Classifying, by implementing a previously trained Machine Learning (ML)-based trained classification model, said patient into one among a first class of patients with a patient-level numeric score under a predetermined threshold value and a second class of patients with a patient-level numeric score equal to or above the predetermined threshold value,
  Correlating the classification of said patient as previously determined with the clinical metadata record about the patient for determining a score vector associated with the determined first lesion,
thus achieving said stratification of said plurality of patients in function of their immunotherapy response.

It is thus provided a novel method of patient stratification between respondents and non-respondents to immuno-oncology (IO). This original method, based on deep-learned features extracted owing to automatic AI-based models that have been fully-trained, goes beyond traditional radiomic standards, opening new perspective for a broader uptake of machine learning solutions in both patient care and drug development.

Based on latest Machine Learning advances, the here proposed method allows predicting non-invasively a patient's tumor response to immuno-oncology therapy based treatment. As this will appear clearly below, the here proposed method operates not only on early stage conditions though a whole organ and lesion-agnostic analysis for prediction, but also on advanced metastatic stages through a multi-organ analysis performing a disease-agnostic and stage-agnostic prediction, potentially in accordance with response criteria defined by the evaluation methodology know under the acronym "RECIST 1.1".

According to some embodiments (examples) of the first aspect of the invention:

The method further comprises, for at least one patient among the plurality thereof:
  Generating a visual explanation of stratification of said at least one patient associated with said first determined lesion. The step consisting in generating a visual explanation may comprise:
    Generating, in function of each radiographic image of the batch, a 2D heatmap, and
    Generating, in function of the 2D heatmaps and the patient-level numeric score as previously determined, a volumetric heatmap including a 3D representation of the first determined lesion revealing where relevant information for scoring of the first determined lesion lies, and optionally.
    visual matching and searching of patterns or correlations using at least one machine learning methodology, in function of the volumetric heatmap and the clinical metadata record about said at least one patient, so as to generate said visual explanation of stratification of said at least one patient associated with said first determined lesion;

said Deep Neural Network (DNN) model may be trained, in function of a set of radiographic images of a training cohort of patients, for determining the threshold value to be considered for classification;

said Machine Learning (ML)-based classification model is trained, with respect to a cutoff value (low vs high), in function of said patient-level numeric score by using a classification model for establishing a correlation with clinical metadata record about the patient;

the 2D analysis of each radiographic image of the batch may comprise:

Preprocessing the radiographic image by windowing,
Generating at least one multi-channel lesion patch associated with the first determined lesion in function of the radiographic image as previously preprocessed, and
Implementing, in function of the at least one multi-channel lesion patch, said previously trained Deep Neural Network (DNN) model.

The method may further comprise, after the preprocessing step:
Defining, on each preprocessed radiographic image, a bounding box of said first determined lesion,
so as for the generation step to be performed in function of the defined bounding box.

The implementation step (of said previously trained DNN model) may comprise:
Computing local features by implementing a previously trained convolutional neural network (CNN) model,
Mean pooling of computed local features, and
Scoring, by logistic regression, the local features as pooled;

In alternative to the last item, implementation step (of said previously trained DNN model) may comprise:
Computing local features by implementing a previously trained convolutional neural network (CNN) model,
Weighting the computed local features with an attention mechanism,
Mean pooling of weighted local features, and
Scoring, by logistic regression, the weighted local features as pooled;

the correlation step may be performed by implementing a comparison function with metric evaluation between the class into which the patient has been classified and said clinical metadata record;
the clinical metadata records may comprise a low or high value of an immuno-oncology response of the patient;
According to the two last items, said metric evaluation is performed between said patient-level numeric score and said low or high value of the immuno-oncology response of the patient;
With more than one determined lesion having been scanned on the radiographic images, the method may further comprise: repeating the steps of the method for at least one another determined lesion, then aggregating the score vector as determined for the first determined lesion and the score vector as determined for said at least one another determined lesion.

According to some embodiments (examples) of the first aspect of the invention, said radiographic images comprise at least one among:
Computed Tomography (CT) images, and
MRI images acquired by magnetic resonance imaging (MRI),
if needed said radiographic images being radiographic images of one among the non-contrasted phase, the arterial phase, the portal venous phase and the delayed phase.

According to some embodiments (examples) of the first aspect of the invention, said radiographic images are provided as DICOM (Digital Imaging and Communications in Medicine) image files.

According to some embodiments (examples) of the first aspect of the invention, the clinical metadata records (clinical ground truth) are generated from clinical ground truth acquired for each patient of said plurality.

According to some embodiments (examples) of the first aspect of the invention, the method further comprises, before providing said radiographic images:
controlling quality of said radiographic images, thus retaining radiographic images having a quality value superior to a determined value.

A further aspect of the invention relates to a non-transitory computer readable medium storing instructions which, when implemented by at least one digital processing device, performs at least the steps of the method according the first aspect of the invention and/or to a computer program product comprising instructions which, when implemented by at least one digital processing device, performs at least the steps of the method according the first aspect of the invention.

Other objects, features and advantages of the invention(s) disclosed herein, and their various embodiments/aspects, may become apparent in light of the descriptions of some exemplary embodiments that follows.

BRIEF DESCRIPTION OF THE DRAWINGS

Reference will be made in detail to embodiments of the disclosure, non-limiting examples of which may be illustrated in the accompanying drawing figures. Some figures may be in the form of diagrams. Some elements in the figures may be exaggerated; others may be omitted, for illustrative clarity.

Any text (legends, notes, reference numerals and the like) appearing on the drawings are incorporated by reference herein.

DETAILED DESCRIPTION

Figure 1:
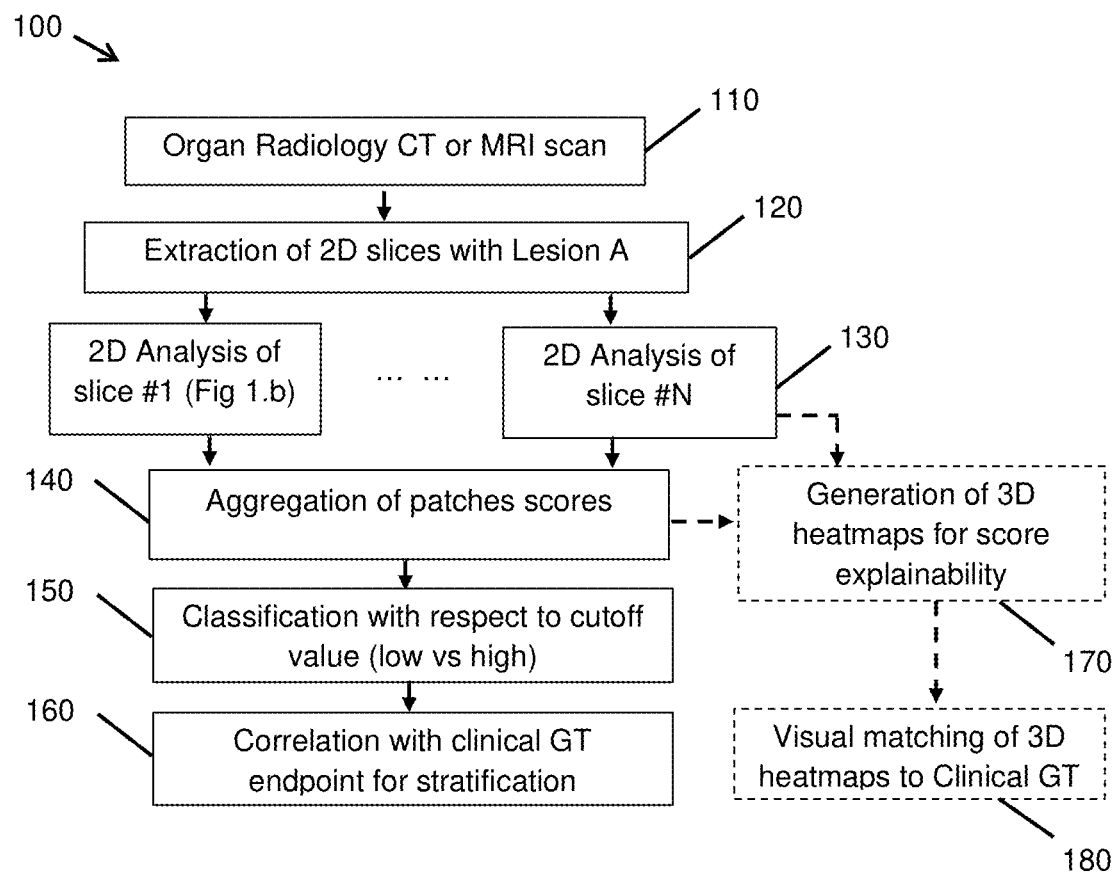
FIG. 1 is a flowchart of an embodiment of the method according to the present invention.

Radiomics is a process of extraction and analysis of quantitative features, called radiomic features, from diagnostic, and in particular radiographic, images. A cluster of radiomic features is a "radiomic signature" or equivalently "image signature".

According to the present invention, the term "scan" is a procedure that provides radiographic images issued from at least one medical imaging technique. At least one of the following two medical imaging acquisition techniques or modalities is particularly foreseen to be used in the framework of the present invention:
1) Computed Tomography (CT) scanning of a patient with and without a contrast agent injected prior to the scanning and
2) Magnetic resonance imaging (MRI), with or without a contrast agent injected prior to the scanning, together with Magnetic Resonance Elastography (MRE).

A non-contrasted radiographic image is generated without injecting a contrast agent to the patient prior to the scanning.

A contrasted radiographic image is generated with injecting a contrast agent to the patient prior to the scanning. The contrast agent may be designed to highlight specific areas to make at least one chosen among blood vessels, organs and tissues more visible during a scanning, and potentially at different determined times after the injection. Thus, a contrasted radiographic image may for instance aim at highlighting the arterial phase during a first scanning step, and the portal venous phase during a second scanning step, by using the same contrast agent at different determined times after the injection or by using different contrast agents. Another phase might be observed during a scan according to the present invention that is called delayed phase because the corresponding scanning step is delayed, with a determined period of time, with respect to at least one among the first and second scanning steps as introduced above. Such a scanning of the delayed phase can allow highlighting other specific areas to make other features more prominent with respect to arterial and/or portal venous phases. Delayed phase acquisition during a further scanning step of a scan according to the present invention can follow either acquisition of the arterial phase and/or acquisition of the portal venous phase.

A scan according to the present invention may comprise a series of scanning steps made by implementing at least once one of the two above mentioned medical imaging techniques in order to provide radiographic images of interest.

An objective function indicates how much each variable contributes to the value to be optimized in a given problem.

According to the present invention, the term "machine learning" refers to computer algorithm(s) able to automatically make classification(s) without explicit programming. The computer algorithm builds said mathematical model from training data.

The term "clinical ground truth" or "clinical metadata" refers to data about a patient which have been acquired by physical examination, medical examination, or clinical examination. It may comprise at least one among: age, sex, height, weight, BMI, ethnic origin, medical conditions, risk factors, nodule size, IO response (for instance low or high value), treatment type, and tumor type of each patient.

A heatmap (or heat map) is a data visualization technique that displays magnitude of a phenomenon in two dimensional color layout. The variation in color may be by hue or intensity, giving obvious visual cues to the reader about how the phenomenon is clustered or varies over space.

The term "windowing" refers to a process used to modify images in a computed tomography (CT) or MRI scan. It refers more particularly to a technique for modifying radiographic images from CT or MRI scan modalities which allows, by choosing a range of gray levels, to reveal either the soft tissues, or the bone structures, or the skin. For instance, we are talking about bone window, lung window.

The term "patch" refers to a part of a radiographic image as defined for instance by windowing of said radiographic image.

The term "multi-channel lesion patch" refers to a multi-dimensional matrix (Depth-Height-Width) representing a set of patches where Depth refers to the number of channels and Height and Width refer to the size of the lesion(s) patch.

In convolutional neural networks, pooling refers to a form of non-linear down-sampling. Mean pooling partitions the input image into a set of rectangles and, for each such sub-region, outputs the mean value of the pixels.

Since image-level radiomic features demonstrate very promising results and high performance of the statistical models, the inventors hypothesize that Artificial Intelligence (AI) and specifically deep learning (DL) based algorithms can automatically quantify radiographic characteristics that are related to and may therefore act as non-invasive radiomic biomarkers for immunotherapy response.

The below detailed method is proposed to extract image features with no pre-defined constraints.

The whole pipeline of a preferred embodiment of the here proposed method is illustrated through annexed FIGS. 1, 2, 3 and 4.

FIG. 1 shows how patients are scored and classified, and how these outputs may be explained to the patient. These scoring and classification, and potentially the explanation outputs, are derived through a slice-by-slice 2D analysis as illustrated for example by FIG. 2. That 2D analysis involves a deep neural network model that can be embodied in two ways that are shown for illustrative purposes on FIGS. 3 and 4, respectively.

FIG. 1 shows a flowchart of an embodiment of the here proposed method.

According to the embodiment illustrated on FIG. 1, the invention provides a method 100 for stratification of a plurality of patients in function of their immunotherapy response.

For each patient among said plurality, the method 100 comprises a step consisting in providing 110:
  radiographic images of slices of patient's body part, such as the abdomen, comprised of an organ showing a first determined lesion, and
  clinical metadata record about the patient (clinical ground truth),
as data related to each patient.

Said radiographic images may be chosen at least among the following ones:
  Computed Tomography (CT) images, and
  MRI images acquired by magnetic resonance imaging (MRI).

They can be radiographic images of one among the non-contrasted phase, the arterial phase, the portal venous phase and the delayed phase, for instance in function of the phases known as needed to emphasizes the ad hoc parameter(s) characterizing said first determined lesion. Generally, at least two radiographic images are provided for each slice during one single scan, said at least two radiographic images being of different phases from each other.

Said radiographic images are preferably provided as DICOM (Digital Imaging and Communications in Medicine) image files.

Quality of each of said radiographic images may have been controlled before being provided 110. Such a control allows retaining radiographic images having a quality value superior to a determined threshold value.

For each of the plurality of patients, his/her clinical metadata records may be generated from clinical ground truth acquired by physical examination, medical examination, or clinical examination.

Always for each patient among the plurality, the method 100 further comprises a step consisting in extracting or selecting 120, among said set of radiographic images, radiographic images into which the first determined lesion has been scanned. Those radiographic images are then gathered in a batch of radiographic images relevant for the determined first lesion.

Then the method 100 further comprises a step consisting in a 2D analysis performed based on each slice containing the first determined lesion. More particularly, for each radiographic image of the batch, said step consists in performing 130, by implementing a previously trained Deep Neural Network (DNN) model, said 2D analysis for extracting, from each radiographic image of the batch, at least one numeric score, as a corresponding image feature, correlated to a biomarker known as predicting the immunotherapy response of the patient.

It is to be noted here that said biomarker known as predicting the immunotherapy response of the patient may indeed be known from the state of the art, and the currently detailed method 100 is not limited to any particular biomarker among the known ones. In the same manner, said at least one numeric score correlated to such a biomarker is at least as known from the state of the art. More than one single numeric score per biomarker may be extracted if needed. Preferably, said at least one numeric score is correlated to a biomarker also provided independently into said clinical metadata record about the patient.

The method 100 can thus on the one hand take benefit of the most recent studies already defining biomarker(s) relevant for following evolution of any kind of disease the patient may have, on the other hand be improved by taking benefit of new knowledge that future studies will provide to the skilled person. There is thus no restriction about biomarker(s) to be envisioned, about the kind of image feature(s) which can be extracted or about the way such an extraction is performed, except that the biomarker has to be known as predicting the immunotherapy response of the patient and that the extraction can be performed based on each radiographic image of the aforementioned batch.

With regard to said Deep Neural Network (DNN) model, there is no restriction about the instructions that define it. It could be a homemade Deep Neural Network (DNN) model or another one already known or to be proposed in the future and designed for allowing extraction of numeric score(s) as defined above.

Said Deep Neural Network (DNN) model must be trained. Its training may be performed in function of a set of radiographic images of a training cohort of patients. This training may allow determining a threshold value to be considered for subsequent classification 150 as detailed below.

Thus, as well as the methods of the second type itemized in the background part of this application, the proposed method 100 allows avoiding any priors on what visual features are relevant to deal with a given problem of computer vision. In other words, the proposed method 100 encompasses extraction of imaging features that are not pre-defined and not necessarily depending on an organ of interest, while taking benefit of information that, into each radiographic image, are not easy, nay impossible, to extract through a naked eye analysis performed by a radiologist, as experienced as he/she is.

Figure 2:
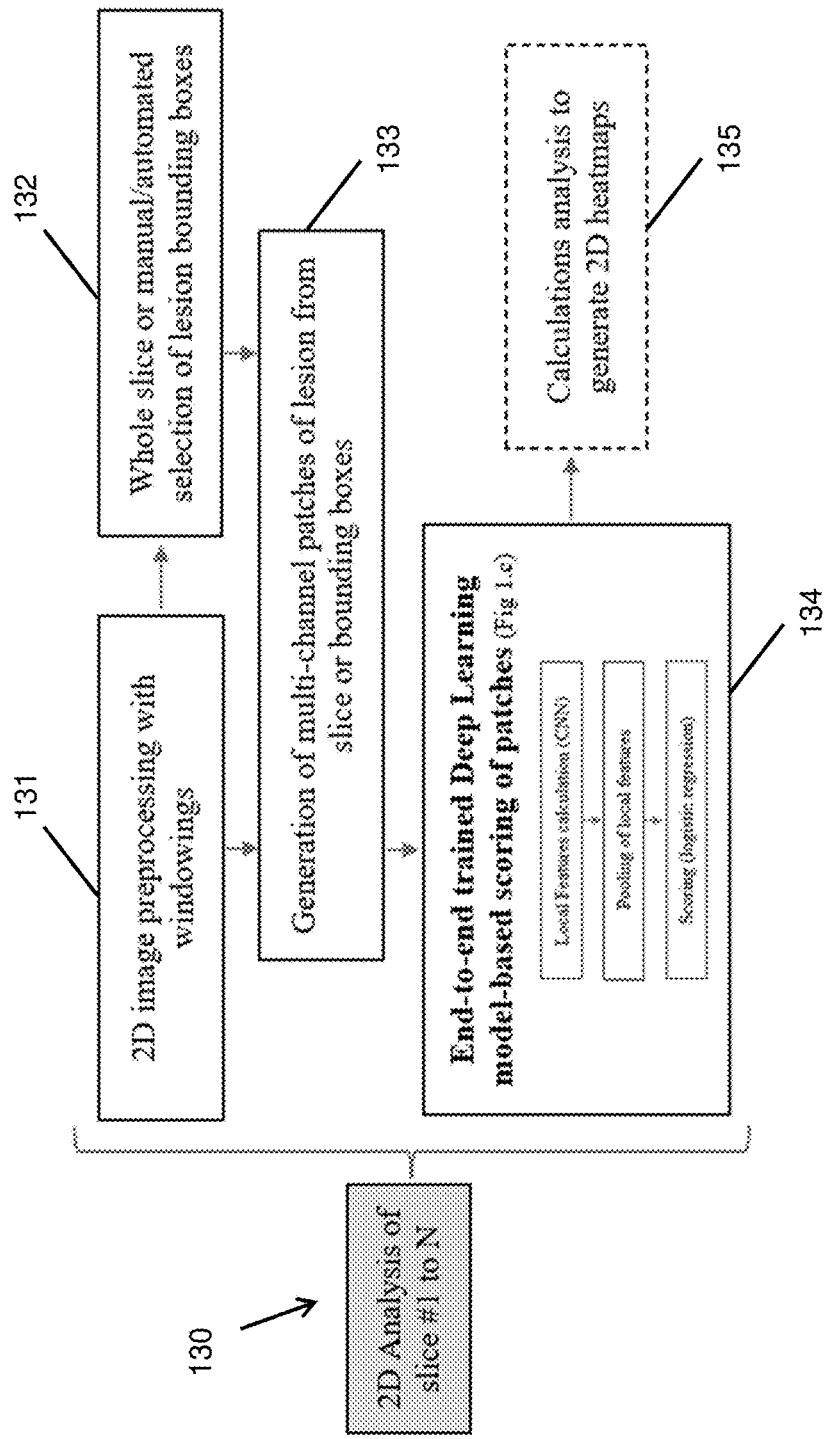
FIG. 2 is a flowchart of an embodiment of a step of the method as illustrated on FIG. 1 and consisting in a slice-by-slice 2D analysis.

FIG. 2 shows a flowchart of an embodiment of the step 130 of the method 100 illustrated on FIG. 1. Said step 130 consists in the aforementioned slice-by-slice 2D analysis.

With reference to FIG. 2, the aforementioned 2D analysis may consist in the following substeps. First, each radiographic image is pre-processed 131 by applying at least one predefined relevant windowing. Then, either manual of automated bounding-boxes around said first determined lesion may be generated 132. In some cases, the whole radiographic image can also be selected. Preprocessed radiographic images, and bounding-boxes if applicable, are then used to generate 133 at least one multi-channel lesion patch. Said at least one multi-channel lesion patch is then processed 134 by a deep model that outputs a score. Note here that calculations resulting in that score may further be analyzed with a view to generating 135 heatmaps that emphasize most informative region(s) of said at least one multi-channel lesion patch.

Coming back to FIG. 1, the method 100 further comprises a step consisting in aggregating 140 the numeric scores previously extracted for determining a patient-level numeric score. This latter is defined for each patient of the plurality. It can comprise a single real or complex value, or be composed of a collection of numeric scores in the form of a matrix, a set, a list or a vector. The format into which numeric scores as extracted 130 are aggregated 140 may thus be chosen among several known, homemade or future formats, the only requirements being that the aggregated numeric score(s) be representative of the patient response to immune-therapy and be comparable in a relevant manner to the aforementioned threshold value to be considered for subsequent classification 150.

After the above detailed aggregation step 140, the method 100 comprises the aforementioned classification step 150. This step consists in classifying 150, by implementing a Machine Learning (ML)-based classification model, said patient into one among a first class of patients with a patient-level numeric score under said predetermined threshold value and a second class of patients with a patient-level numeric score equal to or above the predetermined threshold value.

Each patient of the plurality is thus classified in function of their immunotherapy response.

Moreover, the method 100 further comprises a step consisting in correlating 160 the classification of a given patient among the considered plurality with the clinical metadata record about said given patient, for determining a score vector associated with the first determined lesion. More particularly, each clinical metadata record may comprise a clinically evaluated value of an immuno-oncology response of the patient. This value may simply be "low" or "high".

This result is the one of a task known, in the here concerned technical field, as stratification of patients. Actually, each patient of the plurality is thus stratified between low and high values of immuno-therapy response by taking into account, not only the deep-learned image feature(s) extracted from its radiographic images, but also with a strong correlation with its clinical Ground Truth (GT), or with at least one relevant information among the ones ordinarily findable in clinical Ground Truth (GT).

Potentially, even if this constitutes, over prior art, a significant advantage achievable through the here proposed method 100, this latter may further allow deriving visual explanation about the achieved stratification, to the attention of any one among data scientist developing software solutions for radiomics, the practitioner who is in charge of the stratified patient, and the stratified patient him(her)self. The optional aspect of such a derivation of visual explanation is depicted on FIG. 1 by the fact that concerned blocks are in dashes.

More particularly, said visual explanation about the achieved stratification may be derived by:
  Generating 135, in function of each radiographic image of the batch, a 2D heatmap, then
  Generating 170, in function of the 2D heatmaps and the patient-level numeric score as previously determined, a volumetric heatmap including a 3D representation of the first determined lesion revealing where relevant information for scoring of the first determined lesion lies.

The generation step 135 was already mentioned above. It can directly follow the 2D analysis 130 as detailed above.

The generation step 170 requires knowing said patient-level numeric score and thus can be implemented after the aggregation step 140.

The generation of said visual explanation about the achieved stratification may further comprise a step consisting in visual matching and searching of patterns or correlations 180, in function of the volumetric heatmap and the clinical metadata record about said at least one patient.

Thus the output of said 2D analysis may be two-fold: patient-level numeric scores are derived for the plurality of patients and a visual explanation of this(these) score(s) may be provided through a heatmap revealing where relevant information for scoring lies in the scanned slices of a patient.

Figure 3:
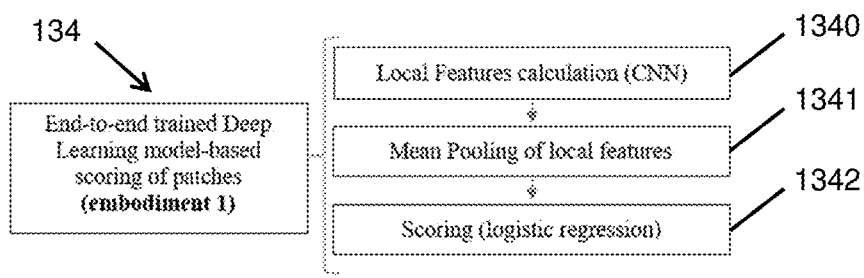
FIG. 3 schematically illustrates a first example of the step consisting in a slice-by-slice 2D analysis as illustrated on FIG. 2.
Figure 4:
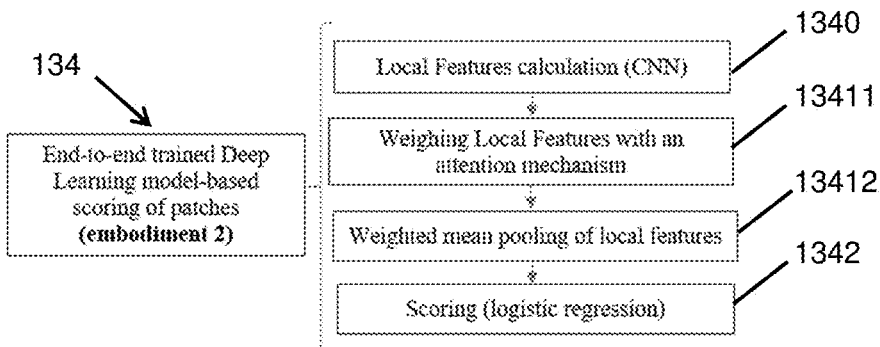
FIG. 4 schematically illustrates a second example of the step consisting in a slice-by-slice 2D analysis as illustrated on FIG. 2.

FIG. 3 schematically illustrates an example for implementation of the slice-by-slice 2D analysis as illustrated on FIG. 2, while FIG. 4 schematically illustrates another example for implementation of the same step.

Thus two versions of the used deep neural network model are considered, said two versions being illustrated on FIG. 3 and FIG. 4 respectively.

In the first version as illustrated on FIG. 3, local features are computed 1340 by implementing a previously trained convolutional neural network (CNN) model and then are pooled 1341 together by simply averaging them, before scoring 1342, by logistic regression, the local features as pooled.

In the second version as illustrated on FIG. 4, after computation 1340 of the local features, an attention mechanism is used to derive 13411 weights for said local features, if needed these latter being previously brought to a vector format. In that case, the local features are thus pooled 13412 through a weighted average.

The first version can be trained with less data than the second one. However, the second one can lead to higher performances and attention weights can provide more information for the subsequent generation of visual explanation already describe above.

In view of the foregoing, it appears that the method 100 according to the first aspect of the invention allows patient stratification between respondents and non-respondents to immuno-oncology (10).

Based on deep-learned features extracted owing to automatic AI-based models that have been fully-trained, the here proposed method 100 goes beyond traditional radiomic standards, opening new perspective for a broader uptake of machine learning solutions in both patient care and drug development.

More particularly, the here proposed method 100 allows predicting non-invasively a patient's tumor response to immuno-oncology therapy based treatment.

As this appear clearly though the detailed description above, the here proposed method 100 operates on early stage conditions though a whole organ and lesion-agnostic analysis for prediction.

Nonetheless, as this will appear with the description given below of a further embodiment of the here proposed method 100, the here proposed method 100 can also operate on advanced metastatic stages through a multi-organ analysis performing a disease-agnostic and stage-agnostic prediction.

Figure 5:
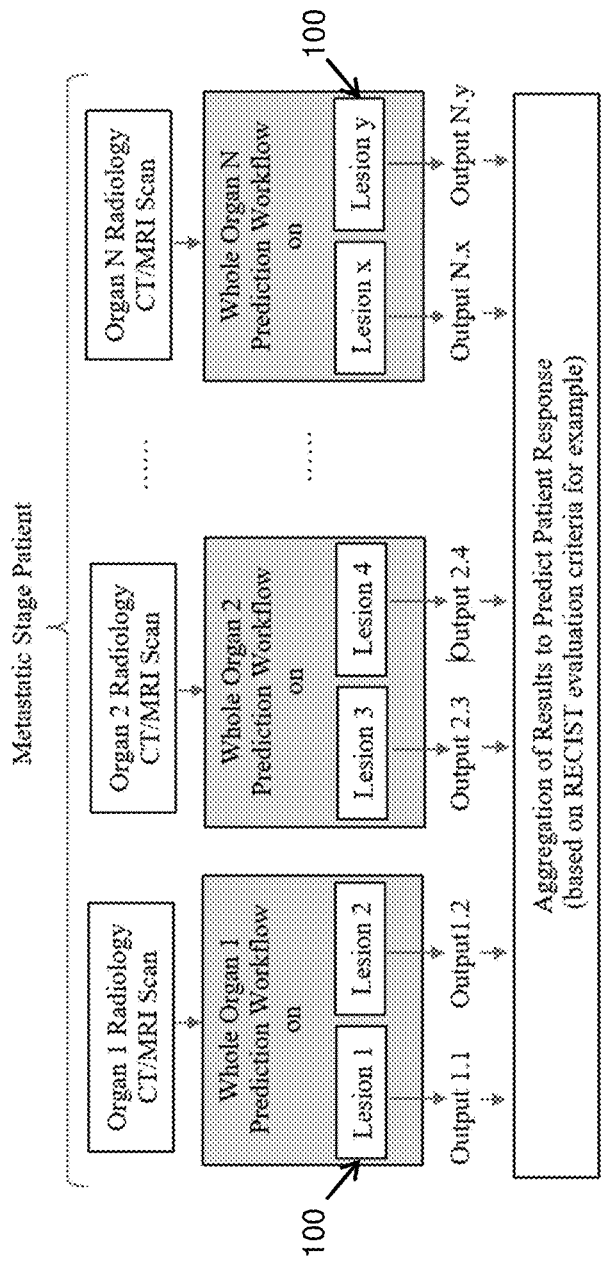
FIG. 5 is a flowchart of an embodiment of the method according to the present invention particularly designed for metastatic stage patients.

FIG. 5 is a flowchart of an embodiment of the here proposed method 100 particularly designed for metastatic stage patients.

FIG. 5 illustrates that, in case of advance stage (metastasis with several lesions in a same organ or in multiple organs), the process described above can be deployed for each lesion among said several lesions or for a selection thereof. Then the outcomes from each of multiple lesion analysis can be aggregated to predict the overall patient response. Moreover, such an aggregation can be performed according to RECIST 1.1 evaluation criteria for example.

More particularly, the aggregation of sets of patient-level numeric scores and optionally of 2D heatmaps can involve implementation of an automatic AI-based ML model to predict the Patient Response (values), nay a comparison of the obtained predictions with the given RECIST criteria values so as to output a RECIST evaluation criteria metric.

The embodiments and aspects of the here detailed invention(s) may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

Reference may be made to disclosures of prior patents, publications and applications. Some text and drawings from those sources may be presented herein, but may be modified, edited or commented to blend more smoothly with the disclosure of the present application. Citation or identification of any reference should not be construed as an admission that such reference is available as prior art to the disclosure.

The methods described herein may be implemented on any form of computer or computers. The components thereof may be implemented as dedicated applications or in client-server architectures, including a web-based architecture, and can include functional programs, codes, and code segments. Any of the computers may comprise a processor, a memory for storing program data and executing it, a permanent storage such as a disk drive, a communication port for handling communications with external devices, and user interface devices, including a display, keyboard, mouse, etc. When some software or algorithms are involved, they may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of various embodiments of the invention, reference has been made to a preferred embodiment illustrated in the drawings, and specific language has been used to describe this embodiment. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like.

What is claimed is:

1. A method of radiomics for stratification of a plurality of patients in function of their immunotherapy response, the method comprising:
    for each patient among the plurality thereof:
        providing:
            a set of radiographic images of slices of at least a patient's body part, and
            clinical metadata record about the patient;
        extracting, among said set of radiographic images, radiographic images into which a first determined lesion has been scanned, those radiographic images being then gathered in a batch of radiographic images relevant for the determined first lesion,
        for each radiographic image of the batch, performing, by implementing a previously trained Deep Neural Network (DNN) model, a 2D analysis of the radiographic image for extracting therefrom at least one numeric score, where said at least one numeric score is correlated to a biomarker known as predicting the immunotherapy response of the patient, preferably said biomarker being also provided independently into said clinical metadata record about the patient,
        for the batch of radiographic images, aggregating the numeric scores previously extracted for determining a patient-level numeric score,
        classifying, by implementing a previously trained Machine Learning (ML)-based classification model, said patient into one among a first class of patients with a patient-level numeric score under a predetermined threshold value and a second class of patients with a patient-level numeric score equal to or above the predetermined threshold value,
        correlating the classification of said patient as previously determined with the clinical metadata record about the patient, for determining a score vector associated with the first determined lesion,
    thus achieving said stratification of said plurality of patients in function of their immunotherapy response.

2. The method according to claim 1, further comprising, for at least one patient among the plurality thereof:
    generating a visual explanation of stratification of said at least one patient associated with said first determined lesion.

3. The method according to claim 2, wherein generating a visual explanation comprises:
    generating, in function of each radiographic image of the batch, a 2D heatmap, and
    generating, in function of the 2D heatmaps and the patient-level numeric score as previously determined, a volumetric heatmap including a 3D representation of the first determined lesion revealing where relevant information for scoring of the first determined lesion lies.

4. The method according to claim 3, further comprising:
    visual matching and searching of patterns or correlations using at least one machine learning methodology, in function of the volumetric heatmap and the clinical metadata record about said at least one patient, so as to generate said visual explanation of stratification of said at least one patient associated with said first determined lesion.

5. The method according to claim 1, wherein said Deep Neural Network (DNN) model is trained, in function of a set of radiographic images of a training cohort of patients, for determining the threshold value to be considered for classification.

6. The method according to claim 1, wherein said Machine Learning (ML)-based classification model is trained, with respect to a cutoff value, in function of said patient-level numeric score by using a classification model for establishing a correlation with clinical metadata record about the patient.

7. The method according to claim 1, wherein the 2D analysis of each radiographic image of the batch comprises:
    preprocessing the radiographic image by windowing,
    generating at least one multi-channel lesion patch associated with the first determined lesion in function of the radiographic image as previously preprocessed, and
    implementing, in function of the at least one multi-channel lesion patch, said previously trained Deep Neural Network (DNN) model.

8. The method according to claim 7, further comprising, after the preprocessing step:
    defining, on each preprocessed radiographic image, a bounding box of said first determined lesion,
    so as for the generation step to be performed in function of the defined bounding box.

9. The method according to claim 7, wherein the implementation step comprises:
    computing local features by implementing a previously trained convolutional neural network (CNN) model,
    mean pooling of computed local features, and
    scoring, by logistic regression, the local features as pooled.

10. The method according to claim 7, wherein the implementation step comprises:
    computing local features by implementing a previously trained convolutional neural network (CNN) model,
    weighting the computed local features with an attention mechanism,
    mean pooling of weighted local features, and
    scoring, by logistic regression, the weighted local features as pooled.

11. The method according to claim 1, wherein the correlation step is performed by implementing a comparison function with metric evaluation between the class into which the patient has been classified and said clinical metadata record.

12. The method according to claim 11, wherein said metric evaluation is performed between said patient-level numeric score and said low or high value of the immuno-oncology response of the patient.

13. The method according to claim 1, wherein the clinical metadata records comprises a low or high value of an immuno-oncology response of the patient.

14. The method according to claim 1, wherein said radiographic images comprise at least one among:
   Computed Tomography (CT) images, and
   MRI images acquired by magnetic resonance imaging (MRI), and
if needed said radiographic images being radiographic images of one among the non-contrasted phase, the arterial phase, the portal venous phase and the delayed phase.

15. The method according to claim 1, wherein said radiographic images are provided as DICOM (Digital Imaging and Communications in Medicine) image files.

16. The method according to claim 1, wherein, more than one determined lesion has been scanned on the radiographic images, repeating the steps of the method for at least one another determined lesion, then aggregating the score vector as determined for the first determined lesion and the score vector as determined for said at least one another determined lesion.

17. A non-transitory computer readable medium storing instructions which, when implemented by at least one digital processing device, performs at least the steps of the method according to claim 1.

* * * * *